United States Patent
Norman et al.

(10) Patent No.: US 7,084,205 B2
(45) Date of Patent: Aug. 1, 2006

(54) POLYMERIC COMPOSITIONS FOR DEWATERING SEWAGE SLUDGES

(75) Inventors: Peter Ian Norman, Liversedge (GB); Helen Elizabeth Read, Bradford (GB); Nils Berggren, Horsholm (DK)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 10/344,716

(22) PCT Filed: Aug. 14, 2001

(86) PCT No.: PCT/EP01/09377

§ 371 (c)(1),
(2), (4) Date: Feb. 14, 2003

(87) PCT Pub. No.: WO02/16495

PCT Pub. Date: Feb. 28, 2002

(65) Prior Publication Data

US 2003/0178371 A1   Sep. 25, 2003

(30) Foreign Application Priority Data

Aug. 25, 2000   (GB) ................... 0020862.9

(51) Int. Cl.
*C02F 1/56* (2006.01)
*C02F 11/14* (2006.01)
*C08L 79/02* (2006.01)

(52) U.S. Cl. ...................... 524/815; 525/215; 525/216; 525/916

(58) Field of Classification Search ................ 524/815; 525/215, 216, 916
See application file for complete search history.

(56) References Cited

U.S. PATENT DOCUMENTS

| | | | |
|---|---|---|---|
| 4,835,206 A | 5/1989 | Farrar et al. | 524/457 |
| 5,846,433 A * | 12/1998 | Sorensen et al. | 210/709 |
| 5,906,750 A | 5/1999 | Haase | 210/727 |
| 5,938,937 A | 8/1999 | Sparapany et al. | 210/728 |

FOREIGN PATENT DOCUMENTS

| | | |
|---|---|---|
| GB | 2178432 | 2/1987 |
| JP | 2000218297 A * | 8/2000 |
| WO | 98/31748 | 7/1998 |
| WO | 98/31749 | 7/1998 |
| WO | WO 9831748 A1 * | 7/1998 |
| WO | WO 9831749 A1 * | 7/1998 |
| WO | 01/12778 | 2/2001 |

OTHER PUBLICATIONS

Derwent Abstract 2000-574778 for JP 2000 218297, Aug. 8, 2000.

* cited by examiner

*Primary Examiner*—Kelechi C. Egwim
(74) *Attorney, Agent, or Firm*—Shiela A. Loggins

(57) ABSTRACT

Compositions comprising of blends of polymeric materials, including a cationic polymer having an intrinsic viscosity of from 8 to 17 dl/g and a cationic content of from 20 to 100% which may be used in the dewatering of thermophilic sludges.

8 Claims, No Drawings

POLYMERIC COMPOSITIONS FOR DEWATERING SEWAGE SLUDGES

The present invention relates to compositions comprising a blend of polymeric materials in which may be used in the dewatering of sludges.

Over many years numerous processes have been developed for the treatment of waste water which utilise micro-organisms for the destruction of various contaminants, especially organic contaminants, carried by the waste water. The micro-organisms that feed on and, therefore, destroy the contaminants in the waste water form a biomass and after time this biomass forms an excess in the system, such that part must be removed. Consequently, the biomass along with accompanying amounts of silt and the like must be regularly removed from the process. This biomass is generally referred to as sludge and typically includes a wide range of micro-organisms.

Some of these micro-organisms may be harmful to humans and include pathogenic bacteria, enterovirus and certain protozoan organisms. By definition pathogenic organisms are organisms that may be harmful to humans and, therefore, it is important to control the final disposition of the material (sludge) containing these organisms. In general governmental regulations impose various restrictions upon the distribution of sludge having pathogenic organisms. Although regulations of this type vary on a frequent basis, it is generally the rule that the sludge cannot be simply disposed of by distribution on the surface of the ground or in some other manner that could possibly expose humans or water supplies for humans to the pathogens in the sludge.

Sludge also contains other materials including micro-organisms which are not pathogenic in nature. Typically the sludge includes a group of micro-organisms that thrive in what is generally referred to as the thermophilic temperature range. These thermophilic micro-organisms are normally not harmful to humans and there are both aerobic and anaerobic bacteria that thrive within the thermophilic range.

Although the temperature range for high activity of bacteria varies somewhat, thermophilic activity usually takes place within the range of from 50° to 70° centigrade. The pathogenic bacteria usually live within what is referred to as a mesophilic range which is around 37° centigrade or the normal body temperature of humans.

One effective technology for achieving a high degree of pathogen reduction is autothermal thermophilic aerobic digestion, or "ATAD". The ATAD process is an aerobic digestion process that operates in the thermophilic temperature range (40 to 80 degrees Celsius) without supplemental heating. The thermophilic bacteria flourish at these elevated temperatures and have a much higher metabolism rate. This results in a faster rate of soluble organic destruction, when compared to conventional aerobic digestion. As these bacteria destroy the volatile organics, they release energy in the form of heat. The soluble organics are reduced to their lowest components: carbon dioxide and water. This process also has the advantage of reducing the biomass volume. Up to 45% of the solids are destroyed after one week in an ATAD system. This degree of solids reduction is possible in a conventional anaerobic digester after three weeks or in a conventional aerobic digester after two months.

Each country has its own code of conduct and unless the sludge fulfils these demands regarding content of pathogens etc., then restrictions are placed on its use for agriculture purposes.

A major drawback of some digestion systems, such as the ATAD, is the cost of their use. Sludges resulting from the thermophilic digestion process are difficult to dewater and have a very high polymeric flocculant demand compared to the conventional mesophilic anaerobically digested sludge, as discussed in Burnett et al, "Dewaterability of ATAD Sludges", WEFTEC '97, Proceedings from residual & biosolids management, Vol. 2, p. 299–309 (1997).

Accordingly, a need exists for an improved method of dewatering difficult sludges, such as sludges derived from a thermophilic digestion process (for example ATAD), although such a need also exists for sludges derived from other thermophilic digestion processes.

Surprisingly it was found that compositions provided by the current invention reduce the dosage levels of polymeric flocculent required for dewatering sludges, especially in thermophilic sludges. Use of these compositions has also resulted in superior cake solids, floc structure and free drainage when compared to known treatments.

The invention relates to compositions comprising a blend of polymeric materials, which may be used in the dewatering of sludges.

The first aspect of this invention relates to a composition comprising:

a) a cationic polymer having instrinsic viscosity of from 0.01 to 5 dl/g and a cationic content of from 20 to 100%, b) a cationic polymer having an intrinsic viscosity of from 8 to 17 dl/g and a cationic content of from 20 to 100%.

The composition may be in the form of a solid. One or both of the components a) and b) may be in the solid form, such as a bead or a powder, and the blend may be produced by mixing components a) and b).

Preferably the composition is a liquid, such as a composition comprising a non-aqueous liquid and:

a) a cationic polymer having instrinsic viscosity of from 0.01 to 5 dl/g and a cationic content of from 20 to 100%, b) a cationic polymer having an intrinsic viscosity of from 8 to 17 dl/g and a cationic content of from 20 to 100%, wherein the components a) and b) are dispersed in the non-aqueous liquid, the ratio of component a) to component b) is from 90:10 to 10:90, and the intrinsic viscosity of the combined polymer components is from 4 to 15 dl/g.

The composition may be in the form of an aqueous compositions such as aqueous polymer dispersions.

Preferably the ratio of component a) to component b) is from 25:75 to 75:25. More preferably the ratio of component a) to component b) is from 25:75 to 50:50.

The intrinsic viscosity of component a) is preferably from 0.01 to 4 dl/g, particularly from 0.5 to 3.5 dl/g, and more preferably from 1 to 2 dl/g.

Component a) may be prepared from one or more known positively charged monomers, such as those selected from the group consisting of dialkylaminoalkyl (meth)acrylate, including acid addition and quaternary ammonium salts thereof, (meth)acrylamidoalkyltrialkyl ammonium salts, diallyl dialkylammonium salts thereof, 2-vinylpyridine or 4-vinylpyridine. Preferably component a) is a homopolymer.

Component a) may be a polymer prepared from one or more known positively charged monomers, such as those selected from the group consisting of dialkylaminoalkyl (meth)acrylate, including acid addition and quaternary ammonium salts thereof, (meth)acrylamidoalkyltrialkyl ammonium salts, diallyl dialkylammonium salts thereof, 2-vinylpyridine or 4-vinylpyridine and one or more known non-ionic monomers. Such non-ionic monomers may include acrylamide, methacrylamide, N-vinylmethylacetamide, formamide, vinyl acetate, vinyl pyrrolidone, methyl methacrylate, styrene or acrylonitrile. A non-ionic monomer of particular interest is acrylamide.

Component a) may be a linear, branched or cross-linked polymer. Component a) may have a cationic content of from 20 to 100%, or preferably 70 to 100%.

Component b) is formed by polymerisation under conditions such that its molecular weight is sufficiently high that it will contribute useful bridging flocculation properties when used for treating a suspension.

The intrinsic viscosity of component b) is preferably from 8 to 17 dl/g, particularly from 10 to 16 dl/g, and more preferably from 12 to 15 dl/g.

The monomers of which component b) are formed may consist solely of cationic monomer so that the polymer can be a cationic homopolymer or a copolymer made from two or more different cationic monomers. Often, the monomers are a blend of one or more cationic ethylenically unsaturated monomers with one or more other ethylenically unsaturated monomers. Often the blend is formed with acrylamide or other water soluble ethylenically unsaturated non-ionic monomer. Non-ionic monomers may include acrylamide, methacrylamide, N-vinylmethylacetamide, formamide, vinyl acetate, vinyl pyrrolidone, methyl methacrylate, styrene or acrylonitrile.

Component b) may be a cationic amphoteric polymer, in which event ethylenically unsaturated anionic monomer is included in the monomer blend in an amount which is not more than the amount of cationic so as to give a cationic amphoteric polymer. The anionic monomer may be a carboxylic monomer or a sulphonic monomer, e.g., acrylic acid or AMPS.

If anionic monomer is included, the amount of anionic monomer is below 50% and usually 0.5 to 25% by weight, but often it is zero.

The cationic monomer can be a diallyl quaternary monomer, generally diallyl dimethyl ammonium chloride DADMAC, but preferably is a dialkylaminoalkyl (meth) -acrylate or -acrylamide, wherein the alkyl groups generally contain 1 to 4 carbon atoms. Examples are dimethyl or diethyl aminoethyl or propyl (meth) -acrylate or -acrylamide or dimethyl or diethyl aminomethyl (meth) acrylamide. The monomer may be introduced as an acid addition salt or quaternary ammonium salt or the polymer may be converted into such a salt after polymerisation. The quaternising group is usually methyl chloride or other aliphatic quaternising group. Preferably component b) is substantially free of hydrophobic, solubility-reducing, groups such as C4 or higher alkyl (e.g., above C8) or aromatic (such as benzyl) groups on the quaternary nitrogen or elsewhere, since such materials are unnecessary in the invention and reduce the cost performance benefit of the products.

Component b) may be a linear, branched or cross-linked polymer. Component b) can be made in the presence of a small amount (typically 5 to 1,000 ppm, often 5 to 100 ppm) of polyethylenically unsaturated monomer or other cross linking agent so as to give products which have an ionic regain of at least 20%.

Component b) may have a cationic content of from 20 to 100%, or preferably 30 to 70% and more preferably 40 to 60%.

The active polymer components of the composition preferably have a combined intrinsic viscosity of from 5 to 11 dl/g.

The composition may be a dispersion or an emulsion. The composition may be a water in oil emulsion or a liquid dispersion polymer, such as a polymer in oil emulsion.

Component a) of the composition may be prepared by any known method of addition polymerisation, however a preferred method involves preparing an aqueous phase comprising of the dialkylaminoalkyl (meth)acrylate monomer, then mixing with a non-aqueous phase comprising an emulsifier and homogenising. After degassing the resulting emulsion, a chain transfer agent may be added to the emulsion. The polymerisation process involves an aqueous reaction medium, preferably deionised water, which may contain a chelating agent, and a buffer.

A suitable polymerisation initiator dissolved in water is added. A redox initiator system may be used, such as tertiary Butyl Hydroperoxide used in conjunction with Sodium Metabisulphite. Reduction of any free monomer present is also preferred, and may be carried out by heating with 2,2'-Azobis(2-methylbutyronitrile).

Component b) of the composition may be prepared by any known method of addition polymerisation, however a preferred method involves preparing an aqueous phase comprising of the dialkylaminoalkyl (meth)acrylate monomer, then mixing with a non-aqueous phase comprising an emulsifier and homogenising. The polymerisation process involves an aqueous reaction medium, preferably deionised water, which may contain a chelating agent, and a buffer.

A suitable polymerisation initiator dissolved in water is added. A redox initiator system may be used, such as tertiary Butyl Hydroperoxide used in conjunction with Sodium Metabisulphite. Reduction of any free monomer present is also preferred, and may be carried out by heating with 2,2'-Azobis(2-methylbutyronitrile).

The method of preparing a composition according to the invention may comprise preparing components a) and b) then mixing the components.

A further aspect of the present invention provides a liquid composition comprising a blend of:

b) a cationic polymer having an intrinsic viscosity of from 8 to 17 dl/g and a cationic content of from 20 to 100%, c) a water soluble low IV cationic coagulant which has an IV of not more than 1.5 dl/g and preferably comprises a polyamine which is present in an amount of less than 25%, and the composition has a viscosity (Brookfield RVT, spindle 6, 20 rpm, 25° C.) of less than 30,000 cps and is a dispersion of component b) and component c), referred to as the low IV coagulant polymer, in an aqueous phase containing a water soluble inorganic salt.

The preferred embodiments of this further aspect are described as follows:

Component b) is formed by polymerisation under conditions such that its molecular weight is sufficiently high that it will contribute useful bridging flocculation properties when used for treating a suspension.

The intrinsic viscosity of component b) is preferably from 8 to 17 dl/g, particularly from 10 to 16 dl/g, and more preferably from 12 to 15 dl/g.

The monomers of which component b) are formed may consist solely of cationic monomer so that the polymer can be a cationic hompolymer or a copolymer made from two or more different cationic monomers. Often, the monomers are a blend of one or more cationic ethylenically unsaturated monomers with one or more other ethylenically unsaturated monomers. Often the blend is formed with acrylamide or other water soluble ethylenically unsaturated non-ionic monomer. Non-ionic monomers may include acrylamide, methacrylamide, N-vinylmethylacetamide, formamide, vinyl acetate, vinyl pyrrolidone, methyl methacrylate, styrene or acrylonitrile.

Component b) may be a cationic amphoteric polymer, in which event ethylenically unsaturated anionic monomer is included in the monomer blend in an amount which is not more than the amount of cationic so as to give a cationic amphoteric polymer. The anionic monomer may be a carboxylic monomer or a sulphonic monomer, e.g., acrylic acid or AMPS.

If anionic monomer is included, the amount of anionic monomer is below 50% and usually 0.5 to 25% by weight, but often it is zero.

The cationic monomer can be a diallyl quaternary monomer, generally diallyl dimethyl ammonium chloride DADMAC, but preferably is a dialkylaminoalkyl (meth) -acrylate or -acrylamide, wherein the alkyl groups generally contain 1 to 4 carbon atoms. Examples are dimethyl or diethyl aminoethyl or propyl (meth) -acrylate or -acrylamide or dimethyl or diethyl aminomethyl (meth) acrylamide. The monomer may be introduced as an acid addition salt or quaternary ammonium salt or the polymer may be converted into such a salt after polymerisation. The quaternising group is usually methyl chloride or other aliphatic quaternising group. Preferably component b) is substantially free of hydrophobic, solubility-reducing, groups such as C4 or higher alkyl (e.g., above C8) or aromatic (such as benzyl) groups on the quaternary nitrogen or elsewhere, since such materials are unnecessary in the invention and reduce the cost performance benefit of the products.

Component b) may be a linear, branched or cross-linked polymer. Component b) can be made in the presence of a small amount (typically 5 to 1,000 ppm, often 5–100 ppm) of polyethylenically unsaturated monomer or other cross linking agent so as to give products which have an ionic regain of at least 20%.

Component b) may have a cationic content of from 20 to 100%, or preferably 30 to 70% and more preferably 40 to 60%.

The amount of component b) is usually above 15% and preferably it is at least 17% and generally at least 20%. Preferred compositions generally contain from 20 or 25% up to 30 or 35%, but compositions of the invention can contain as much as 40% of component b) or more. These percentages are by weight of the total composition.

The water soluble low IV cationic coagulant has an IV of not more than 1.5 dl/g as measured using a suspended level viscometer on solutions of the coagulant polymer alone in 1 molar sodium chloride buffered to pH 7.5 at 25° C. It is generally present in an amount of at least 2 or 3%, often at least 5%, by weight of the composition. The cationic coagulant preferably comprises a polyamine coagulant polymer, for instance a polymer made by condensation of an amine and/or a diamine or higher amine (e.g., ethylene diamine or tetraethylene pentamine) with epichlorohydrin or other epihalohydrin or with dichloroethane or other dihalo alkane. Preferred polymers are formed by condensation of epichlorohydrin with dimethylamine and a small amount of ethylene diamine or other multi-amine to cause cross linking.

Usually the polyamine coagulant is used as the only low IV cationic coagulant but if desired blends of it with other low IV cationic coagulants can be used. If a blend of coagulant polymers is being used, the polyamine is usually more than 50% (and generally above 80%) of the blend. The total amount of polyamine (and usually the total amount of low IV cationic coagulant) is less than 25% but is usually at least 2 or 3% by weight of the total composition. Generally it is not more than 15% and preferably not more than 10%.

One suitable other cationic coagulant that can be used as part of the coagulant polymer is cationic dicyandiamide polymer. Another suitable coagulant polymer is polyethyleneimine. Another is a homopolymer or a high cationic copolymer of water soluble ethylenically unsaturated cationic monomer optionally with a comonomer, usually not more than 30% by weight acrylamide. The cationic monomer can be any of those discussed above for the high IV polymer but is preferably DADMAC.

When referring to a water soluble monomer we mean that the monomer has conventional high solubility at 25° C., generally above 5 or 10% in deionised water, and similarly a water soluble polymer has conventional high water solubility typically of above 5 or 10% in deionised water, at which concentration it may form a gel when the IV is high.

The compositions preferably contain more of component b) than the coagulant polymer, e.g., a weight ratio of 1:0.1 to 1 and generally 1:below 1, usually around 1:0.15 to 0.5.

The amount of water in the composition is usually from 30 to 70%, preferably around 40 to 60%, and in particular it is generally in the range 45 to 55% by weight of the total composition.

It is necessary to include water soluble inorganic salt in the composition. The amount is normally at least 10% by weight and is usually at least 15% by weight of the composition. It can be as much as 30% or even 35%. The upper limit is dictated primarily by the solubility of the particular salt in the composition, and in particular in the aqueous phase of the composition, since it is unnecessary and therefore undesirable to have significant amounts of undissolved salt in the composition. Preferably substantially all the salt is in solution. Preferably the concentration of salt is substantially the saturation concentration of that salt in the composition, for instance being an amount of 80 to 105%, preferably 90 to 100%, of the saturation concentration.

The salt is preferably a salt which has high solubility in water and it can be an ammonium, alkali metal or alkaline earth metal chloride, bromide or iodide, such as ammonium chloride, sodium chloride or magnesium chloride, or it can be a sulphate such as ammonium sulphate.

Water soluble polyvalent salts, such as polyaluminium chloride, can be used and have the advantage that their presence may then contribute to the performance of the composition since such polyvalent salts often have coagulating properties themselves. Mixtures of salts are often preferred, especially ammonium sulphate and sodium chloride.

The composition is generally made by dissolving most or all of the salt in an aqueous solution of the polyamine (optionally blended with other polymeric coagulant) preferably so as to provide a solution which is substantially saturated in the salt, and then adding the monomer or monomer blend. Often it is desirable for the monomer or monomer blend to be added as an aqueous solution and it is then generally preferred for this solution to contain inorganic salt, preferably in an amount such that the solution is substantially saturated in the salt. Polymerisation of the monomer or monomer blend in the aqueous phase can be initiated using thermal initiator or redox initiator. Initiator may be added both to start the reaction and during the reaction. It is added in an amount and at a time which will result in the polymer having the chosen IV.

If desired, polyethylene glycol or other multi-hydroxy compound may be included in the coagulant solution, in order to promote stability and reduce viscosity but this is usually unnecessary. The multi-hydroxy compound can be a dihydroxy, trihydroxy or higher hydroxy compound such as glycerol or a polymer such as polyvinyl alcohol. When polyethylene glycol is being used the molecular weight is preferably below 1000, e.g., about 200, but can be higher e.g., up to 4000 or even 10000.

The compositions of the present invention may be used as a dewatering aid. Separation may be by sedimentation but preferably it is by centrifugation or filtration. Preferred processes of solid-liquid separation are centrifugal thickening or dewatering, belt pressing, belt thickening and filter pressing. One preferred process of the invention comprises utilising the resultant composition for flocculating a suspension of suspended solids, especially sewage sludge.

The compositions may be generally used as part of a process for dewatering the suspension and so the flocculated suspension is normally subjected to dewatering. Pressure filtration may be used. This pressure filtration may be by high pressure filtration, for instance on a filter press at 5 to 15 bar for, typically, ½ to 6 hours or low pressure filtration, for instance on a belt press, generally at a pressure of 0.5 to 3 bar, typically 1 to 15 minutes.

The compositions are used by dosing with or without applied agitation into the suspension, followed by dewatering of the suspension. Optimum results require accurate dosing and the correct degree of agitation during flocculation. If the dose is too low or too high flocculation is inferior. The optimum dose depends upon the content of the suspension and so variations in it, for instance variations in the metal content of industrial sewage effluent, can greatly affect performance. The flocs are very sensitive to shear and agitation, especially if the dosage is not at an optimum, is likely to redisperse the solids as discrete solids. This is a particular problem when the flocculated solids are to be dewatered under shear, for instance on a centrifuge, because if dosage and other conditions are not optimum the centrate is likely to have a high discrete solids content. The composition can flocculate waste or aid dewatering of waste in order to permit quick and efficient removal of the water from the waste solids.

Other methods of addition include onstream, direct addition, batch addition and addition with other clarification and purification agents. These methods are known to those familiar with the art.

The optimum amount required for treatment of a particular aqueous system will depend upon the identity of the waste solids present. Those familiar with the art will be able to empirically determine the optimum amount required for tests performed on an aliquot of the actual waste. For example, precipitation of the waste solids from the aliquot using differing amounts of composition will usually reveal which concentration produces clarified water. After introduction of the composition, the treated particulate matter and water may be separated by siphoning, filtering, centrifuging or by using other common techniques.

The compositions of the present invention are useful for dewatering or flocculating aqueous suspensions or mixtures of organic and inorganic materials or suspensions made entirely of organic material. Examples of such aqueous suspensions include industrial waste from dairies, canneries, chemical manufacturing waste, distillery waste, fermentation waste, waste from paper manufacturing plants, waste from dyeing plants, sewage suspensions such as any type of sludge derived from a sewage treatment plant including digested sludge, activated sludge, raw or primary sludge or mixtures thereof. In addition to the organic material present, the aqueous suspensions may also contain detergents and polymeric materials which will hinder the precipitation process. Modified methods for treatment in view of these factors are known to those familiar with the art.

The compositions of the present invention may be used in the dewatering of many different types of sewage sludge, including raw, primary and activated sludges, which may be treated with the present compositions after mesophilic anaerobic digestion. However thermophillically anerobic digested sludges or thermophillically aerobic digested sludges are preferred, such as ATAD and TAND (thermophillically anerobic digested) sludges.

Typical doseage levels for the liquid composition are in the range of 8 to 20 kg/t of active polymer based on the dry solids, usually 10 to 15 kg/t based on the dry solids content.

The following examples further illustrate the present invention:

EXAMPLE 1

Preparation of Component a).

The aqueous phase is prepared as follows. EDTA sodium salt at 40% (0.6 g), adipic acid (3.7 g) and dimethylaminoethyl methacrylate quaternary ammonium salt (217.8 g) are stirred into a sufficient amount of water to give a total aqeous phase of 363 g and until the acid is dissolved.

The oil phase is prepared as follows. Sorbitan monooleate emulsifier (8.7 g), a 2:1 molar ratio Stearyl Methacrylate: Methacrylic acid stabiliser, (2.9 g) and a sufficient amount of volatile hydrocarbon to give a total oil phase of 187 g, are stirred together in a beaker.

The aqueous phase and oil phase are transferred to a container and homogenised for 2.5 minutes per litre using a Silverson homogeniser, at maximum speed.

The resulting monomer emulsion is transferred to a suitable resin pot and degassed for at least thirty minutes using nitrogen.

The free rise polymerisation is initiated by feeding tertiary Butyl Hydroperoxide in a volatile hydrocarbon and Sodium Metabisulphite emulsion to the polymerisation mixture at a feed rate of 200 ppm per hour to give a temperature rise of 2 degrees Celcius per minute.

Free monomer is reduced by heating the emulsion to 85° C., adding 133 ppm of 2,2'-Azobis (2-methylbutyronitrile based on the weight of emulsion and the temperature is maintained at 85° C. for 45 minutes. A further 67 ppm of 2,2'-Azobis(2-methylbutyronitrile based on the weight of emulsion, is then added then the temperature is maintained at 85° C. for a further thirty minutes.

The emulsion is then cooled to below 40° C. and a carrier oil (156 g) is added. Azeotropic distillation is then carried out using a rotary evaporator.

The resulting polymer, dispersed in mineral oil, is then activated with 6% of a fatty alcohol ethoxylate type activator, based on the weight of the polymer product.

EXAMPLE 2

Preparation of Component b).

The aqueous phase is prepared as follows. EDTA sodium salt at 40% (0.7 g), adipic acid (4.6 g), acrylamide (70.7 g) and methylene bis acrylamide (3.9 g) are stirred into a sufficient amount of water to give a total aqeous phase of 400 g and until the acid is dissolved. Dimethylaminoethyl acrylate quaternary ammonium salt (106 g) is then added.

The oil phase is prepared as follows. Sorbitan monooleate emulsifier (9.6 g), a 2:1 molar ratio Stearyl Methacrylate: Methacrylic acid stabiliser (5.0 g), a carrier oil (125.7 g) and a sufficient amount of volatile hydrocarbon to give a total oil phase of 273.5 g are stirred together in a beaker.

The aqueous phase and oil phase are transferred to a container and homogenised for 2.5 minutes per litre using a Silverson homogeniser, at maximum speed.

The resulting monomer emulsion is transferred to a suitable resin pot and degassed for at least thirty minutes.

The free rise polymerisation is initiated by feeding tertiary Butyl Hydroperoxide in a volatile hydrocarbon and Sodium Metabisulphite emulsion at an initial feed rate of 10 ppm per hour to the polymerisation mixture and adjusted to give a controlled polymerisation rate of 1 to 1.5 degrees Celcius per minute.

Free monomer is reduced by heating the emulsion to 85° C., adding 133 ppm of 2,2'-Azobis (2-methylbutyronitrile based on the weight of emulsion and the temperature maintained at 85° C. for 45 minutes. A further 67 ppm of 2,2'-Azobis(2-methylbutyronitrile based on the weight of emulsion is added and the temperature maintained at 85° C. for a further thirty minutes.

The emulsion is then cooled to below 40° C. and a carrier oil (156 g) is added. Distillation is then carried out using a rotary evaporator. The resulting polymer, dispersed in mineral oil, is then activated with 6% of a fatty alcohol ethoxylate type activator, based on the weight of the polymer product.

EXAMPLE 3

Evaluation of Samples

Standard piston press tests are carried out using 200 ml aliquots of thermophilically digested sludge, flocculated using a Citenco mixer set at a speed of 3000 revolutions per minute. A mixing time of ten seconds is employed. The flocculated samples are allowed one minute of free drainage before being transferred to the presses. A press cycle of ten minutes is utilised using a maximum pressure of 100 psi. The results are shown in table 1:

TABLE 1

| Sample | Dose kg/tDs | 5s filtrate volume (ml) | Floc-size | Filtrate Quality | Cake Release | Cake solids (%) |
|---|---|---|---|---|---|---|
| 1 | 14.2 | 38 | small | dirty | good | 18.4 |
| 1 | 14.7 | 96 | large | dirty | good | 20.07 |
| 1 | 15.2 | 112 | large | dark yellow | good | 19.54 |
| 1 | 15.6 | 102 | large | dirty | good | 17.9 |
| 2 | 12.3 | 20 | small | dirty | very poor | 14.93 |
| 2 | 12.7 | 46 | medium | dirty | good | 18.22 |
| 2 | 13.2 | 90 | large | dark yellow | good | 18.67 |
| 2 | 13.7 | 80 | large | dark yellow | good | 18.75 |
| 3 | 12.2 | 34 | small | dirty | good | 19.31 |
| 3 | 12.6 | 80 | large | dark yellow | good | 20.67 |
| 3 | 13.1 | 80 | large | dark yellow | good | 21.35 |
| 3 | 13.6 | 90 | large | dark yellow | good | 20.9 |
| 3 | 14.1 | 90 | large | dark yellow | good | 20.8 |

Sample 1: Component (b) as prepared in example 2

Sample 2: Component (a) as prepared in example 1 and Component (b) as prepared in example 2 (in a ratio of 25:75)

Sample 3: Component (a) as prepared in example 1 and Component (b) as prepared in example 2 (in a ratio of 50:50)

The results show that the compositions of the present invention show improved filtrate quality and improved dose efficiency when compared to using a single polymeric component, such as sample 1.

EXAMPLE 4

Preparation of a Water in Water Emulsion Product

Into a 1 litre flask fitted with a stirrer, condenser, nitrogen and thermometer was charged the continuous phase comprising:

| | |
|---|---|
| water | 414.0 g |
| polyamine | 48.0 g |
| ammonium sulphate | 160.0 g |
| sodium chloride | 18.0 g |

The continuous phase was purged with nitrogen for one hour.

A monomer phase was prepared from

| | |
|---|---|
| dimethylaminoethyl acrylate methyl chloride salt | 96.0 g |
| acrylamide | 56.0 g |
| citric acid | 8.0 g |

The monomer phase was added to the continuous phase and the contents of the flask were degassed with nitrogen for half an hour. The nitrogen was removed and the following initiators were then added:

250 ppm of 3% 2,2 azobis (2-amidopropane hydrochloride)

25 ppm of 0.5% potassium bromate 25 ppm of 1.0% sodium metabisulphite

The reaction is allowed to exotherm followed by leaving the reaction at 70° C. for a further hour, then cooled. The product has an intrinsic viscosity of 8.5 dl/g.

EXAMPLE 5

Bench Scale Evaluation of Free Drainage

Standard free drainage tests are carried out using 200 ml aliquots of thermophilically digested sludge, flocculated using a Citenco mixer set at a speed of 1500 revolutions per minute. A mixing time of fifteen seconds is employed. The results are shown in table 2:

TABLE 2

| Sample | Dose kg/tDs | 5s filtrate volume (ml) | Floc-size | Filtrate Quality |
|---|---|---|---|---|
| 4 | 11.1 | 64 | small | Clear, fines |
| 4 | 12.6 | 84 | small-medium | Clear, few fines |
| 4 | 14.2 | 84 | medium-large | Clear, few fines |
| 4 | 15.9 | 80 | medium-large | Clear, fines |

Sample 4: composition as prepared in example 3

The results show that the compositions of the present invention show good filtrate quality and free drainage.

EXAMPLE 6

Piston Press Evaluation of Free Drainage

Standard piston press tests are carried out using 200 ml aliquots of ATAD sludge flocculated using a Janke Kunkel mixer set at a speed of 1500 revolutions per minute. A mixing time of 12 seconds is employed.

The flocculated samples are allowed one minute free drainage before being transferred to the presses. A press cycle of 10 minutes is utilised using a maximum pressure of 100 psi and the presses were fitted with Saran cloths. The results are shown in table 3.

TABLE 3

| Sample | Dose kg/tDs | Cake solids (%) | Floc-size | Filtrate Quality |
|---|---|---|---|---|
| 4 | 51.0 | 20.16 | medium-large | Dark brown |
| 4 | 54.4 | 17.56 | large | Brown |
| 4 | 58.8 | 14.88 | Very large | turbid |

The results show that the compositions of the present invention may be used with ATAD sludges.

The invention claimed is:

1. A composition comprising:
   a) a cationic polymer having intrinsic viscosity of from 0.01 to 5 dl/g and a cationic content of from 70 to 100% and,
   b) a cationic polymer having an intrinsic viscosity of from 8 to 17 dl/g and a cationic content of from 20 to 100%,
   wherein the composition is a non-aqueous liquid and components a) and b) are dispersed in the non-aqueous liquid, the ratio of component a) to component b) is from 90:10 to 10:90, and the intrinsic viscosity of the combined polymer components is from 4 to 15 dl/g.

2. A composition according to claim 1 wherein component a) is prepared from at least one monomer selected from the group consisting of dialkylaminoalkyl (meth)acrylate, including acid addition and quaternary ammonium salts thereof, (meth)acrylamidoalkyltrialkyl ammonium salts, diallyl dialkylammonium salts thereof, 2-vinylpyridine and 4-vinylpyridine.

3. A composition according to claim 1 wherein component b) is prepared from at least one monomer selected from the group consisting of diallyl quaternary monomers, dialkylaminoalkyl (meth) -acrylates or -acrylamides, wherein the alkyl groups contain 1 to 4 carbon atoms, including acid addition salts and quaternary ammonium salts thereof.

4. A composition according to claim 1 wherein the active polymer components of the composition have a combined intrinsic viscosity of from 5 to 11 dl/g.

5. A method of preparing a composition in a non-aqueous liquid comprising:
   a) a cationic polymer having intrinsic viscosity of from 0.01 to 5 dug and a cationic content of from 70 to 100%,
   b) a cationic polymer having an intrinsic viscosity of from 8 to 17 dug and a cationic content of from 20 to 100%,
   wherein the components a) and b) are dispersed in the non-aqueous liquid, the ratio of component a) to component b) is from 90:10 to 10:90, and the intrinsic viscosity of the of the combined polymer components is from 4 to 15 dl/g, comprising of mixing components a) and b).

6. A composition according to claim 1 in which the amount of component b) is above 15%, based on the total weight of the composition.

7. A method for dewatering a sewage sludge by adding the composition according to claim 1 to the sewage sludge.

8. A method according to claim 7 wherein the sewage sludge is a thermophilic sludge.

* * * * *